United States Patent [19]

Ruff

[11] 4,011,183
[45] Mar. 8, 1977

[54] BUILDING BOARD PRODUCTS AND PROCESS FOR PRODUCING SAME

[75] Inventor: David Lee Ruff, Torrance, Calif.

[73] Assignee: Grefco Inc., Bala Cynwyd, Pa.

[22] Filed: July 22, 1976

[21] Appl. No.: 707,668

[52] U.S. Cl. .............................. 260/9; 260/2.5 AK; 260/33.6 UB; 260/37 N; 260/DIG. 24; 264/DIG. 7

[51] Int. Cl.$^2$ ...................... C08L 5/00; C08L 1/00

[58] Field of Search .... 260/37 N, 2.5 AK, DIG. 24, 260/9, 33.6 UB; 106/DIG. 2; 264/DIG. 7

[56] References Cited

UNITED STATES PATENTS 3,156,576  11/1964  TeGrotenhius .................. 260/37 N
3,965,051  6/1976  Markusch et al. ............... 260/37 N

FOREIGN PATENTS OR APPLICATIONS 526,481  9/1972  Switzerland .................. 106/DIG. 2

OTHER PUBLICATIONS

"Chemical Abstracts"; vol. 82; No. 59030f; Moldings; 1975.

*Primary Examiner*—Lewis T. Jacobs
*Attorney, Agent, or Firm*—Howson and Howson

[57] ABSTRACT

Shaped articles for construction and insulation which are water repellent are prepared by dry blending expanded perlite particles and fibers, applying to the resulting mixture a solution of a reactive synthetic organic binder in a low boiling organic solvent. The binder is capable of being cured at ambient temperatures and of reacting with hydroxyl groups present in the perlite and fibers to provide the articles with water repellent properties. The mixture containing binder is formed into the desired shape, e.g. panels, solvent is removed and the binder is cured at substantially ambient or slightly higher temperatures.

29 Claims, No Drawings

BUILDING BOARD PRODUCTS AND PROCESS FOR PRODUCING SAME

PRIOR ART

Insulating and building board comprising expanded perlite fibers of organic and/or inorganic material has been made by forming an aqueous slurry of expanded perlite which may be coated with a thermoplastic material, e.g. asphalt, and a fibrous substance, forming the material into a web or sheet while simultaneously removing water, pressing the sheet to the desired thickness and density, and drying the product thus made. By reason of the presence of the thermoplastic material such board products do not absorb water to a damaging extent. U.S. Pat. No. 2,622,872 is directed to insulating board made in the above-described manner.

There are variations in the process and resulting board product, e.g. the board may first be formed and subsequently impregnated with asphalt, but fundamental features of the process are forming a web or sheet from an aqueous slurry, followed by removal of water including drying at substantially elevated temperatures, such as 275°–475° F.

Shaped articles for construction and insulation have also been made by mixing expanded perlite with lime and water to produce a dough-like material, kneading the dough-like material, adding further water, and holding the material at an elevated temperature for a period of time sufficient to effect drying (see U.S. Pat. No. 3,590,111).

Although water, the process fluid used in the above-processes, is seemingly a cheap fluid, its high boiling point requires the expenditure of large quantities of energy for removal during the drying step. This generally means that wet process production plants must be located in close proximity to a relatively cheap natural gas supply. With natural gas and propane in apparent short supply, and with prices likely to increase substantially, the economic viability of such wet processes must be questioned. The drying requirements of a wet process plant also usually dictate a huge production facility situated in a geographic location which may be a compromise between energy availability and marketplace. Capital expenditures for such a large plant are enormous.

Lightweight insulating units comprising fillers such as expanded perlite and/or fibers in a continuous matrix of a polyurethane foam are also known (see for example U.S. Pat. No. 3,625,872). However, such units, by reason of their low strength find only limited use in the construction industry.

It is an object of this invention to provide a novel method for making insulating and building board which does not use water as a process fluid, thereby making possible substantial economies in terms of energy requirements, plant size and plant location.

Another object of the invention is the provision of insulating and building board which is water repellent and relatively lightweight, yet has adequate strength to be useful for forming walls, partitions and the like.

These and other objects of this invention will become further evident from the following detailed description and appended claims.

Broadly, this invention is directed to a method of producing water repellent shaped articles for construction and insulation, particularly building boards, which comprises applying to expanded perlite particles a solution of a synthetic organic binder in an organic solvent which is a liquid at ambient temperatures and has a boiling point below about 150° F., said binder being capable of curing upon standing at ambient temperatures and of reacting with hydroxyl groups present in said perlite particles, forming said perlite particles into a mass of the desired shape, removing said solvent and curing said binder. Preferably, the expanded perlite particles are dry blended with a fibrous material to form a homogeneous mixture, to which mixture is applied the organic binder. The fibers may also contain hydroxyl groups which react with the binder.

Insulating and building board manufactured according to the method of this invention comprises consolidated expanded perlite particles, or a mixture thereof with fibers, bonded together in a matrix of synthetic organic binder. The board is relatively lightweight, weighing from about 10 to about 20 pounds per cubic foot. By reason of the use of a synthetic organic binder which is capable of reacting with hydroxyl groups present in the expanded perlite and fibers, the board is water repellent. In addition, the board has ample structural strength to be useful for cores of walls, partitions and the like.

Inasmuch as the method of the invention does not use water as a process fluid, but rather a relatively low boiling organic solvent, i.e. one having a boiling point below about 150° F., a typical example of which is methylene chloride (B.P. 104° F.), energy requirements for removal of solvent are quite small. For example, the solvent can be readily removed at oven temperatures not exceeding about 150° F. Advantageously, the solvent so removed can be condensed, collected and recycled to the process. The synthetic organic binder, being capable of being cured at room temperature, does not require heat energy to set the binder. However, curing can be accelerated by means of a low temperature, e.g. 110° F., oven.

Other advantages of the method of the invention are relative freedom of location of the board manufacturing plant, e.g. near large marketing areas, and reduction in plant size, whereby substantial economies can be effected.

Perlite is a generic term for certain volcanic glasses which are aluminum silicates containing relatively small amounts of water, e.g. 2–3%, entrapped in the glassy structure. If ground perlite having a particle size of about 0.2 to 3 mm. is heated rapidly at 1750–2300° F., the individual particles expand due to the internal pressure of the vaporized water. A product is formed comprising bubbles, most of which are sealed. The material, commonly referred to as "expanded perlite," has excellent thermal and sound insulating properties.

In the method and product of the present invention, the expanded perlite may vary considerably in density depending upon the physical properties desired for the board product. Densities in the range of from about 2 to about 5 pounds per cubic foot have been found to produce high quality board products. The sealed-void type of expanded perlite is preferred in board compositions coming within this invention. The expanded perlite should be essentially dry and at a temperature which is below the boiling point of the organic solvent for the binder.

Although the board of this invention can be composed entirely of expanded perlite particles and binder, preferably, the board also includes fibers which may be organic or inorganic in composition and may be of natural or synthetic origin. Mixtures of different types of fibers may be used. Asbestos, mineral wood and glass fibers are typical of suitable inorganic fibers. Suitable naturally occurring cellulosic fibers are hemp, cocoa, jute, etc. Rayon, nylon, vinyon, etc. are examples of synthetic fibers which may be incorporated in the board product.

Reclaimed cellulosic fibers from waste newspapers, magazines and cardboard boxes are in abundant supply, are relatively cheap, and have been found to provide a high quality board product. Fiberization of newspapers, etc. can be accomplished in a hammer mill or other milling machine. The cellulosic fibers so produced should be finely separated to expose maximum surface area for bonding, and should be essentially free of moisture, grease and oil.

In the board product of this invention which contains both expanded perlite particles and fibers, the relative proportions thereof may vary considerably depending upon the physical properties desired in the final board product, and the amount of organic binder used. Thus the expanded perlite may comprise from about 10 to about 85% by weight of the dry mixture of perlite and fibers prior to binder additions. A particularly preferred formulation comprises a mixture of 75 parts by weight of expanded perlite and 25 parts of cellulose fibers obtained by hammermilling newsprint.

The expanded perlite particles and fibers can be dry blended to obtain a substantially uniform mixture in any suitable tumbling or mixing equipment. However, during blending care should be taken to minimize fracture of the expanded perlite spheres. A substantially homogeneous mixture of perlite and fibers can be obtained by tumbling the dry constituents in a drum rotating at about 60 r.p.m. about an axis approximately 45° from the horizontal.

In forming the insulating and building board of this invention there is applied to dry expanded perlite particles, or to a dry blend thereof with fibers, a solution of a particular type of synthetic organic binder in a low boiling organic solvent. The binder should cure at ambient temperatures and be one which is capable of reacting with hydroxyl groups present in the expanded perlite and fibers to render the board product water repellent. By the term "water repellent" is meant that the building board will not absorb water in such quantity as to reduce substantially the strength of the board. It was discovered that polyisocyanates react with the hydroxyl groups of the perlite and fibers to provide the desired water repellency. Such polymeric isocyanates advantageously can be dissolved in a low boiling organic solvent, such as methylene chloride, and applied to the perlite and fibers by spraying. It was also determined that certain urethane resins obtained by reacting a polymeric isocyanate with certain polyfunctional, active hydrogen compounds meet the aforesaid criteria for the binder.

The polyisocyanates which may be used in the process and product of the present invention are aromatic polyisocyanates having no ortho substituent. Some examples of such aromatic polyisocyanates are 4,4' diphenylmethane diisocyanate (MDI), triphenylmethane triisocyanate, biphenyl diisocyanate, 1,5-naphthalene diisocyanate, and polymethylene polyphenyl polyisocyanate and mixtures of such aromatic polyisocyanates. A particularly preferred aromatic polyisocyanate is MDI (diphenylmethane diisocyanate).

As indicated above, rather than using a polyisocyanate per se as the binder, the binder may comprise a urethane resin.

In forming such a urethane resin binder, an aromatic polyisocyanate is reacted with a polyfunctional, active hydrogen-containing compound, as for example a polyhydroxyl and/or polycarboxyl compound having molecular weight of more than about 300 and a functionability of at least two. However, the polyfunctional, active hydrogen-containing compounds should be selected so as to provide a relatively rigid binder. Polyethers based on poly (oxyalkylene) derivatives of polyhydric compounds such as glycerol, 1,1,1-trimethylolpropane, 1,1,6-hexanetriol, sucrose, and sorbitol are particularly useful in providing rigid binders. Highly branched polyesters such as those prepared by reacting adipic and/or phthalic acid with a glycol or triol (e.g. glycerol) may be reacted with the aromatic polyisocyanate to obtain a strong rigid binder for the perlite fibers. Preferred polyfunctional, active hydrogen-containing compounds are those amine-containing, polyoxypropylene derivatives of sucrose.

The quantity of binder applied to the expanded perlite particles, a mixture thereof with fibers, is highly important. Where the binder is solely a polyisocyanate, such as MDI, a sufficient quantity thereof should be applied to react with all of the available hydroxy groups of the perlite and fibers, and leave an excess of about 5% isocyanate groups. These excess isocyanate groups are available for reaction with atmospheric moisture, which takes place in a matter of minutes after application, resulting in a highly hydrophobic product.

In the case of binders comprising a urethane resin, functional active hydrogen-containing compounds should be such as to leave isocyanate groups available for reaction with hydroxyl groups present in the expanded perlite and fibers. It is by means of this latter reaction that the board product of this invention is provided with adequate water repellency. Accordingly, to insure that all of the available hydrogen-containing groups on the perlite, fibers and polyol and reacted, an amount of polyisocyanate sufficient to provide an excess of 5% of isocyanate groups should be used. The total quantity of polyisocyanate will vary depending upon the particular perlite, fibers and polyol. Proper proportions can be determined readily by evaluating the water sorption character of the product.

In order to promote the reaction of isocyanate groups with hydroxyl groups of the expanded perlite and fibers, of the polyfunctional active hydrogen-containing compounds, at present, various catalysts may be used. Examples of catalysts are triethylenediamine, dimethylethanolamine, N-methyl diethanolamine, N-methyl morpholine, N-ethyl morpholine, stannous octoate, stannous oleate, dibutyltin di-2 ethylhexoate dibutyltin dilaurate, dibutylin diacetate.

Preferred catalysts are tertiary amine-cocatalyst combinations such as triethylene diamine-alkanol amine, triethylene diamine-trioxymethylene, N,N,N,N'-tetromethyl 1,3-butone diaminepropylene oxide, and the like. A particularly preferred catalyst is a blend of 20% triethylenediamine and 80% dimethylethanolamine.

The ratio of isocyanate to catalyst is important. Too little catalyst results in insufficient and/or slow curing of the binder which results through reaction between the isocyanate and hydroxyl groups. On the other hand too much catalyst causes the curing reaction to progress so rapidly that the binder is substantially set before the mixture of expanded perlite and fibers coated with binder can be molded and pressed into panels. When this occurs, the board crumbles when removed from the mold. It was determined that in order to effect curing of the binder at ambient temperatures at a reasonably rapid rate to permit efficient panel production, yet at not so rapid a rate as to interfere with the production of structurally sound panels, the weight ratio of aromatic polyisocyanate to catalyst should be from 100:1 to 100:15. A particularly preferred range is from 100:2 to 100:8.

The amount of binder in board products can be varied somewhat to provide different physical properties such as density, MOR, etc. Ordinarily there should be incorporated into the mixture of expanded perlite and fibers from about 10 to about 50 parts by weight of binder solids, based on 100 parts combined weight of dry perlite and fibers. When used in these amounts, the building board products will have a density in the range of about 10 to about 20 pounds per cubic foot and a MOR of about 50 to about 200. Preferably the building board contains about 15 to about 25 parts by weight of binder solids.

Advantageously, in accordance with this invention, the binder, comprising reactant(s) and catalyst, is applied to the dry mixture of expanded perlite and fibers in the form of a solution in an organic solvent which is a liquid at ambient temperatures and has a boiling point below about 150° F. The solvent, of course should not react with the reactive isocyanate and hydroxyl groups of the binder precursors. Examples of suitable solvents are methylene chloride, and various of the halogenated lower aliphatic hydrocarbons having a boiling point slightly above ambient temperatures of about 110°–150° F., thereby minimizing energy costs in producing the board product. The evaporated solvent may be condensed and collected for recycle to the process to effect further savings in manufacturing costs and to avoid pollution of the environment.

Methylene chloride is a preferred solvent because it is nonflammable, has low boiling point (104° F.), which is only slightly above normal plant operating temperatures, and is an excellent solvent for the binder precursors and catalysts. In addition it is an effective penetrant which readily disperses the binder constituents into the fibers and expanded perlite thereby enabling the reactive isocyanate groups to react readily with the hydroxyl groups of the fibers and perlite to provide the building board with water repellent properties.

The concentration of the binder precursors and catalyst in the solvent can vary considerably; however, it is desirable to emply as concentrated a solution as permits adequate application of binder material to the perlite and fibers in order to minimize the costs, in terms of energy and equipment, of removing and recovering solvent. Satisfactory results have been obtained with solutions containing from about 5 to about 60 percent by weight of total binder constituents, i.e. binder precursors and catalysts.

The binder solutions may be applied to the mixture of expanded perlite and fibers by any suitable means which causes the binder constituents to be applied uniformly to the mixture. Spraying the solution as a fairly coarse spray onto the perlite-fiber mixture as it is tumbled in a drum of the above-described type has been found to be an effective means for distributing the liquid completely over the dry components.

Temperatures of the dry components at the time the binder is applied thereto are important. If the expanded perlite is hot, for example, the solvent could flash off before it penetrates sufficiently to allow the binder precursorcatalyst mixture to reach the active hydroxyl sites on the fibers and perlite. Curing of binder prior to board information may also take place.

By reason of the reaction between the isocyanate groups of the aromatic polyisocyanate binder precursor with hydroxyl groups of the fibers and the expanded perlite the board is provided with the required water repellency. Thus, in the building board products of this invention no asphalt or other water repellency additives need be present.

After application of the binder solution to the mixture of expanded perlite and fibers the mixture is placed into a suitable mold, pressed into the board of the desired thickness, e.g. one half inch, an allowed to cure at room temperature during which time the residual methylene chloride or other solvent evaporates. In the alternative the binder of the compressed board may be cured in a low temperature (110°–150° F.) oven or dryer to accelerate the curing reaction and solvent evaporation.

In addition to expanded perlite, fibers and binder, the building board of this invention may contain various fillers such as clay, flame retardants and the like.

The invention is further illustrated by the following example in which parts are by weight unless otherwise specified.

EXAMPLE 75 parts of expanded perlite having a density of about 3 pounds/ft.$^3$ were dry blended with 25 parts of hammermilled newsprint. Into the resulting mixture were sprayed 300 parts of methylene chloride containing 30 parts of diphenylmethane diisocyanate (MDI) and 2 parts of catalyst dissolved therein. The mixture was placed in a rectangular mold and consolidated to form a building board approximately 1 inch thick. The board had a density of 12.5 pounds/ft.$^3$, a MOR of 95 psi, and a water absorption (% by volume) 0.9 after two hours and 3.5 after 24 hours. The board, which is grey in color, is suitable for use as a thermal insulation product.

What is claimed is:

1. A method of producing water repellent shaped articles for construction and insulation which comprises applying to expanded perlite particles a solution of a synthetic organic binder in an organic solvent which is liquid at ambient temperatures and has a boiling point below about 150° F., said binder being capable of curing upon standing at ambient temperatures and of reacting with hydroxyl groups present in said expanded perlite, forming a mass of said particles into the desired shape, removing said solvent and curing said binder.

2. The method according to claim 1 in which said binder comprises an aromatic polyisocyanate having no ortho substituent.

3. The method according to claim 2 in which the amount of polyisocyanate binder employed is such as to provide isocyanate groups about 5% in excess of those required to react with the hydroxyl groups of said perlite.

4. The method according to claim 3 in which said polyisocyanate is 4,4'-diphenylmethane diisocyanate.

5. The method according to claim 1 in which said binder comprises a curable mixture of an aromatic polyisocyanate having no ortho substituent, a polyfunctional, active-hydrogen-containing compound and a catalyst for promoting reaction between isocyanate and hydroxyl groups, said polyisocyanate being present in an amount such as to provide isocyanate groups about 5% in excess of those required to react with the hydroxyl groups of said perlite and said compound.

6. The method according to claim 5 in which said binder comprises a curable mixture of 4,4'-diphenylmethane diisocyanate, and a polyoxypropylene derivative of sucrose, and said catalyst comprises a mixture of about 20%, by weight, triethylenediamine and 80% dimethylethanolamine.

7. A method of producing water repellent shaped articles for construction and insulation which comprises dry blending expanded perlite particles and fibers to obtain a substantially homogeneous mixture, applying to said mixture a solution of a synthetic organic binder in an organic solvent which is a liquid at ambient temperatures and has a boiling point below about 150° F., said binder being capable of curing upon standing at ambient temperatures and of reacting with hydroxyl groups present in said expanded perlite and fibers, forming said mixture containing organic binder into the desired shape, removing said solvent and curing said binder.

8. The method according to claim 7 in which said mixture of expanded perlite and fibers comprises from about 10 to about 85% by weight of said mixture of expanded perlite.

9. The method according to claim 8 in which said mixture of expanded perlite and fibers comprises about 75% by weight of expanded perlite and 25% of cellulosic fibers.

10. The method according to claim 7 in which said binder comprises an aromatic polyisocyanate having no ortho substituent.

11. The method according to claim 10 in which the amount of polyisocyanate binder employed is such as to provide isocyanate groups about 5% in excess of those required to react with the hydroxyl groups of said perlite and fibers.

12. The method according to claim 11 in which said polyisocyanate is 4,4'-diphenylmethane diisocyanate.

13. The method according to claim 7 in which said binder comprises a curable mixture of an aromatic polyisocyanate having no ortho substituent, a polyfunctional, active-hydrogen-containing compound and a catalyst for promoting reaction between isocyanate and hydroxyl groups, said polyisocyanate being present in an amount such as to provide isocyanate groups about 5% in excess of those required to react with the hydroxyl groups of said perlite, fibers and said compound.

14. The method according to claim 13 in which said binder comprises a curable mixture of 4,4'-diphenylmethane diisocyanate, and a polyoxypropylene derivative of sucrose, and said catalyst comprises a mixture of about 20%, by weight, triethylenediamine and 80% dimethylethanolamine.

15. The method according to claim 7 in which said organic solvent for said binder comprises methylene chloride.

16. A shaped article for construction and insulation which is water repellent comprising expanded perlite particles bonded together by a synthetic organic binder, said binder being bonded to said perlite by reaction with hydroxyl groups present in said expanded perlite, said shaped article having a density of from about 10 to about 20 pounds per cubic foot.

17. A shaped article according to claim 16 in which said binder comprises an aromatic polyisocyanate having no ortho substituent.

18. A shaped article according to claim 17 in which the amount of polyisocyanate binder employed is such as to provide isocyanate groups about 5% in excess of those required to react with the hydroxyl groups of said perlite.

19. A shaped article according to claim 18 in which said polyisocyanate is 4,4'-diphenylmethane diisocyanate.

20. A shaped article according to claim 16 in which said binder comprises a curable mixture of an aromatic polyisocyanate having no ortho substituent, a polyfunctional, active-hydrogen-containing compound and a catalyst for promoting reaction between isocyanate and hydroxyl groups, said polyisocyanate being present in an amount such as to provide isocyanate groups about 5% in excess of those required to react with the hydroxyl groups of said perlite and said compound.

21. The method according to claim 20 in which said binder comprises a curable mixture of 4,4'-diphenylmethane diisocyanate, and a polyoxypropylene derivative of sucrose, and said catalyst comprises a mixture of about 20%, by weight, triethylenediamine and 80% dimethylethanolamine.

22. A shaped article for construction and insulation which is water repellent comprising a substantially dry blending homogeneous mixture of expanded perlite particles and fibers bonded together by a synthetic organic binder, said binder being bonded to said perlite and fibers by reaction with hydroxyl groups present in said expanded perlite and fibers, said shaped article having a density of from about 10 to about 20 pounds per cubic foot.

23. A shaped article according to claim 22 in which said mixture of expanded perlite and fibers comprises from about 10 to about 85% by weight of said mixture of expanded perlite.

24. A shaped article according to claim 23 in which said mixture of expanded perlite and fibers comprises about 75% by weight of expanded perlite and 25% of cellulosic fibers.

25. A shaped article according to claim 22 in which said binder comprises an aromatic polyisocyanate having no ortho substituent.

26. A shaped article according to claim 25 in which the amount of polyisocyanate binder employed is such as to provide isocyanate groups about 5% in excess of those required to react with the hydroxyl groups of said perlite and fibers.

27. A shaped article according to claim 26 in which said polyisocyanate is 4,4'-diphenylmethane diisocyanate.

28. A shaped article according to claim 22 in which said binder comprises a curable mixture of an aromatic polyisocyanate having no ortho substituent, a polyfunctional, active-hydrogen-containing compound and a catalyst for promoting reaction between isocyanate and hydroxyl groups, said polyisocyanate being present in an amount such as to provide isocyanate groups about 5% in excess of those required to react with the hydroxyl groups of said perlite, fibers and said compound.

29. A shaped article according to claim 28 in which said binder comprises a curable mixture of 4,4'-diphenylmethane diisocyanate, and a polyoxypropylene derivative of sucrose, and said catalyst comprises a mixture of about 20%, by weight, triethylenediamine and 80% dimethylethanolamine.

* * * * *